United States Patent [19]

Morgan et al.

[11] Patent Number: 5,129,842
[45] Date of Patent: Jul. 14, 1992

[54] MODULAR PATCH PANEL

[75] Inventors: Stuart K. Morgan, Westford; Michael Romm, Brighton, both of Mass.

[73] Assignee: Digital Equipment Corporation, Maynard, Mass.

[21] Appl. No.: 681,935

[22] Filed: Apr. 8, 1991

[51] Int. Cl.⁵ .............................. H01R 13/60
[52] U.S. Cl. .................... 439/532; 439/540
[58] Field of Search .............. 439/532, 716, 709, 536, 439/540

[56] References Cited

U.S. PATENT DOCUMENTS

| | | | |
|---|---|---|---|
| 1,819,657 | 8/1931 | Smith | 439/716 |
| 3,506,947 | 4/1970 | Leskosek | 439/532 |
| 3,963,296 | 6/1976 | Glover et al. | 439/716 |
| 4,591,949 | 5/1986 | Lahr | 439/716 |
| 4,875,880 | 10/1989 | Welch et al. | 439/536 |
| 5,017,155 | 5/1991 | Doyle | 439/532 |

Primary Examiner—Neil Abrams
Attorney, Agent, or Firm—Cesari and McKenna

[57] ABSTRACT

A modular patch panel has a snap-together frame that retains a plurality of faceplates. The faceplates are adapted to receive modules which hold electrical elements, such as, for example, various plugs and electrical connectors.

16 Claims, 4 Drawing Sheets

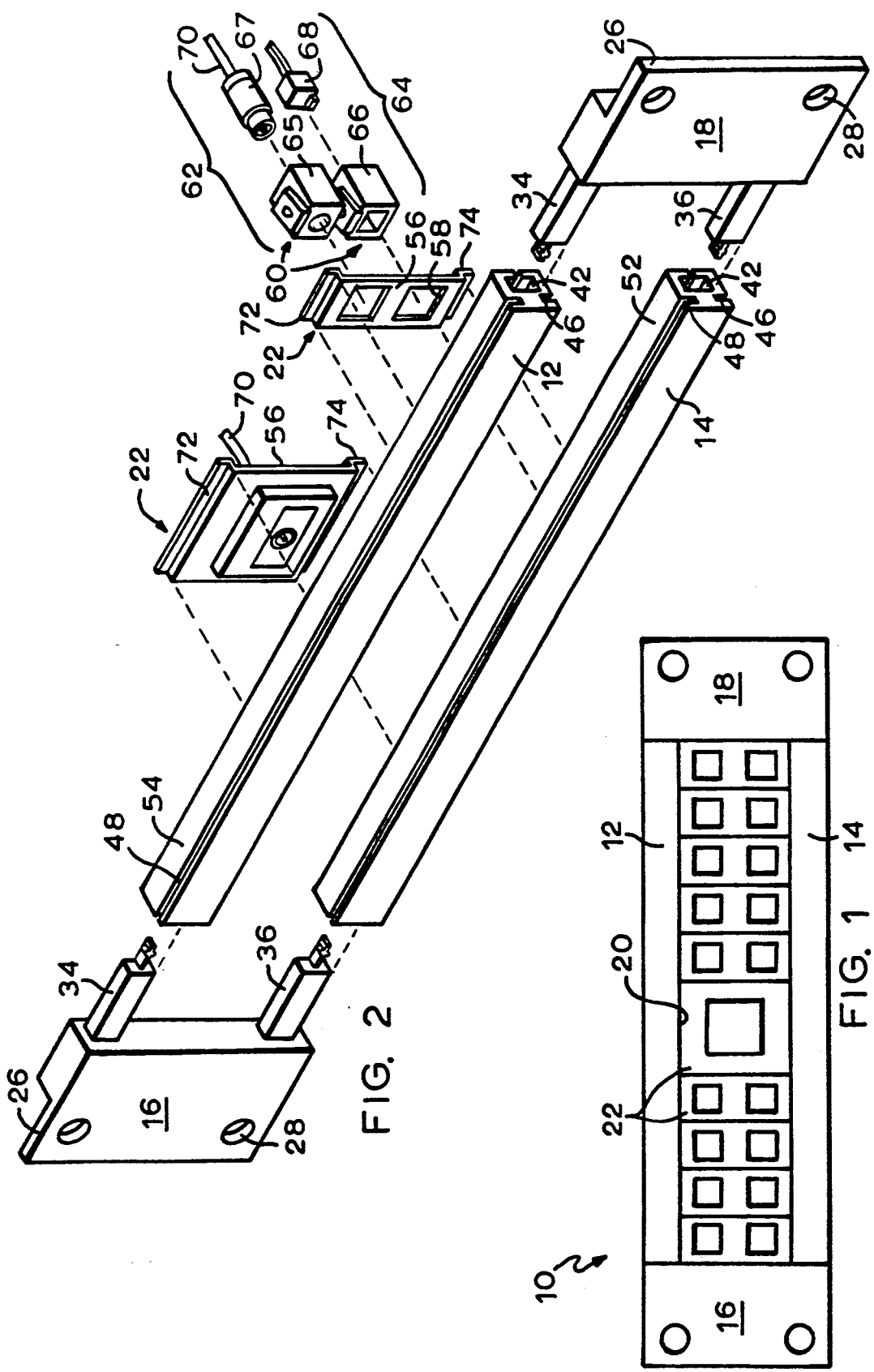

MODULAR PATCH PANEL

FIELD OF THE INVENTION

This invention relates generally to patch panels, and more particularly to modular patch panels suitable for use in computer network systems located in offices Patch panels are sometimes called jack panels or faceplate systems.

BACKGROUND OF THE INVENTION

Conventional patch panels are used to support and mount electrical components such as telephone plugs, electrical connectors, light switches and electrical outlets. For instance, patch panels are used in offices for interconnecting devices (e.g., bridges, repeaters, and servers) in computer network systems. For that reason, various patch panel configurations are needed to support the various electrical elements.

Of course, a different patch panel can be provided for each desired configuration of electrical elements; however, this approach is both inflexible and inefficient since it fails to take advantage of the economies available by using standardized patch panel parts.

Another known approach is a so-called "modular" patch panel, in which a standard patch panel is designed to accommodate a plurality of modules. Typically, the modules have ports which can support the various plugs and electrical connectors.

Commonly-assigned U.S. Pat. No. 4,875,880, entitled "Modular Faceplate System," discloses an example of such a modular system. That patent describes a faceplate system having a faceplate of one-piece, integral construction, which defines a primary opening for receiving one or more secondary support members. The secondary support members have secondary openings for receiving interchangeable modules. The modules in turn support electrical devices, such as plugs or electrical connectors.

In that patent, the secondary support members are secured to the faceplate by snap-type fasteners. The elements of the fasteners are integral with the faceplate and support members, and are of a complex design. While such an approach is practical for many applications, a simpler design would be desirable from the standpoint of both manufacture and use.

Known patch panels, such as that of U.S. Pat. No. 4,875,880, come in a variety of sizes, typically designated in accordance with the number of ports (e.g., 4, 8, or 16) they provide. Typically, a patch panel has either a fixed number of ports, or, in modular panels, can provide any of a rather narrow range of ports. For example, in U.S. Pat. No. 4,875,880, the faceplate system is illustrated as having any number from zero to four ports. A limiting factor is the size of the opening in the faceplate. Of course, different size faceplates can be provided, but, here again, at a sacrifice in the economies of standardization.

SUMMARY OF THE INVENTION

The invention resides in a modular patch panel having a snap-together, expandable frame that retains a plurality of faceplates. The faceplates are adapted to receive modules which hold electrical elements, such as, for example, various plugs and electrical connectors.

In a preferred embodiment, the frame has top and bottom rails, and left and right end caps. Each end cap has a mountable end plate from which spaced, parallel slide bars extend. The slide bars are receivable within central openings of the rails. Detent tabs, mounted on the slide bars, mate with retainers located along tab-receiving grooves of the rails. This snap-together arrangement releasably locks the end caps into the rails in such manner that the assembly can be dismantled without tools.

The faceplates are retained between the rails by a "tongue and groove" arrangement, i.e., end tabs or tongues on the upper and lower edges of the faceplates are slidably received in opposing grooves that extend along the length of the rails. With this arrangement, if a different number of faceplates is desired, longer or shorter rails can be substituted, while continuing to use the balance of the patch panel components.

Consequently, the patch panel in accordance with the invention attains a high level of both flexibility in the number and type of faceplates it can accommodate, and a high level of standardization of its component parts. Furthermore, the patch panel is of simple design and can be manufactured economically. In addition, the patch panel can be readily assembled and disassembled, and modified, all without the aid of tools.

In another embodiment of the invention, a patch panel uses height extenders, e.g., intermediate rails, to interconnect and support a plurality of rows of faceplates between the top and bottom rails. Preferably, the faceplates are secured to the height extenders using a tongue and groove approach identical to that described above. Thus, the patch panel can accommodate a two-dimensional array of faceplates.

In yet another embodiment of the invention, the patch panel has rails of zig-zag configuration that are particularly suitable for use with fiber optic cable connections, e.g., in applications where space is at a premium.

BRIEF DESCRIPTION OF THE DRAWING

The above and further advantages of the invention may be better understood by referring to the following description in conjunction with the accompanying drawings, in which:

FIG. 1 is a front elevational view of a patch panel in accordance with the invention;

FIG. 2 is an enlarged, exploded, perspective view of the patch panel of FIG. 1 with electrical receptacles and wires;

DETAILED DESCRIPTION OF ILLUSTRATIVE EMBODIMENT

Figure 2A:
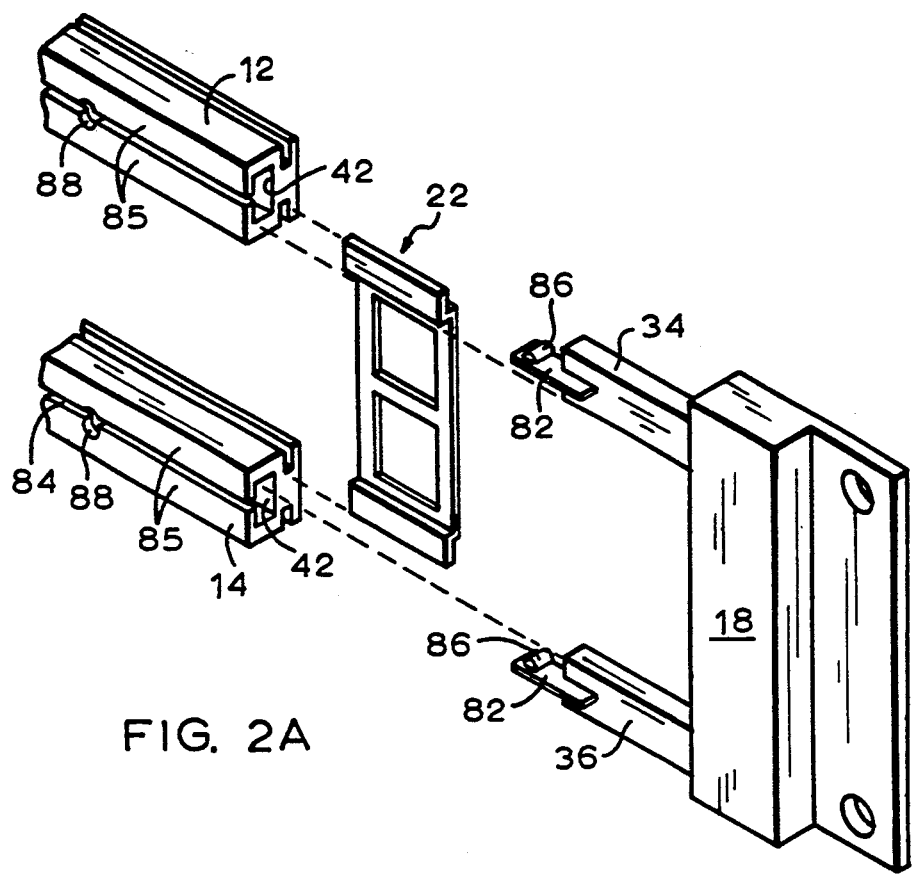
FIG. 2A is a partial, exploded view of the back of the patch panel of FIG. 2, showing the "snap-together" features of the frame thereof.

FIG. 1 shows a patch panel 10 in accordance with the invention. The patch panel 10 has top and bottom elongate, hollow rails 12, 14 extending longitudinally between left and right end caps 16, 18. The rails 12, 14 are in spaced, parallel relation, defining therebetween a generally rectangular opening 20. A plurality of faceplates or bezels 22 are mounted side-by-side in the opening 20.

Figure 7:
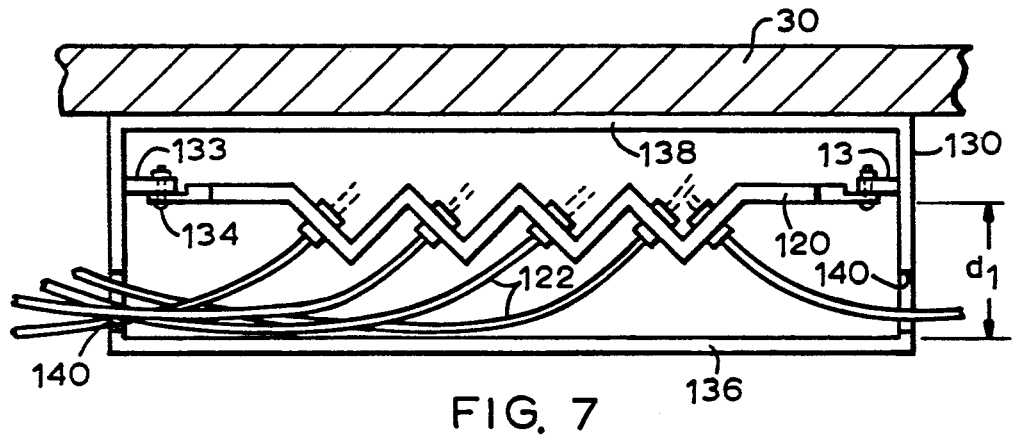
FIG. 7 is a top plan view of the patch panel of FIG. mounted in an enclosure on a wall.

FIG. 2 shows the patch panel 10 in more detail. The end caps 16, 18 have generally coplaner mounting plates 26 provided with mounting features, such as mounting holes 28 for receiving fasteners (not shown), which permit the patch panel 10 to be mounted on a wall 30 (FIG. 7). Each end cap 16, 18 also has a pair of spaced, parallel slide bars 34, 36 extending from the mounting plate 28 in a direction toward the other end cap 18, 16. The end caps 16, 18 are preferably of identical construction.

The rails 12, 14 have central axially-directed openings 42 of generally squared-off-"C-shaped" cross-sections for receiving therein the slide bars 34, 36. The rails also include opposing channels 46, 48 in mutually-facing surfaces, of which only surfaces 52 and 54 of rails 14 and 12 are visible in FIG. 2. This preferred configuration of the rails 12, 14 permits them to be made economically by extrusion.

For purposes of standardization, the rails 12, 14 are preferably of identical construction. Accordingly, top rail 12 has a channel 48 in a surface 54, and bottom rail 14 has a channel 46 in a surface (not shown) facing away from surface 54 with channels 44 and 46 lying in a common plane with panel 10 assembled as in FIG. 1. The channels 48, 46 of respective top and bottom rails 12 14 are non-operational in the embodiment of FIG. 2. It can be appreciated, however, that the top and bottom rails 12, 14 are interchangeable, and, if interchanged, these grooves would be used to hold the faceplates 22 as shown.

The faceplates 22 have main plates 56, which define one or more central openings 58 for receiving modules 60, such as, for example, the electrical connectors 62 and 64. The connectors 62, 64 include receptacles 65, 66, which receive therein and retain electrical plugs 67, 68 that are secured to wires 70.

The modules 60 can comprise any of a variety of electrical connectors or other devices, as will be apparent to those skilled in the art, and are not intended to be limited to those shown in the drawings. The manner of securing the modules 60 to the faceplates 22 can be, for example, that used to secure the modules to the secondary support members of U.S. Pat. No. 4,875,880. The disclosure of that patent is incorporated herein by reference.

The faceplates 22 also have tongues or end tabs 72, 74, which are co-planar and project outwardly rom opposite ends 76, 78 of the main plates 56. The end tabs 72 are shown as upstanding lips extending along the entire length in the longitudinal direction of the faceplates 22. Alternatively, shorter end tabs that extend over a fraction of the faceplates ends can be used in many applications.

The faceplates 22 are retainable by the rails 12, 14 in a "tongue and groove" arrangement. The end tabs 72 are slidably receivable within the groove 46 of rail 12 as are end tabs 74 within the groove 48 of rail 14.

With this arrangement, the heights of the main plates 56 of the faceplates are preferably equal, an less than, preferably just slightly less than, the distance between the rails 12, 14. The width of the faceplates 22, on the other hand, can be whatever is required to accommodate the modules 60.

FIG. 2A shows a "snap-together," detent arrangement by which the end caps 16, 18 are defeatably retained by the rails 12, 14. The slide bars 34, 36 have cantilevered detent tabs 82, which, when the slide bars 34, 36 are slid into channels 42, are received within side grooves or slots 84 of those channels. The side grooves 84 have generally rectangular cross-sections. (As described above, the channels 42 are "C" shaped, and each of the side grooves 84 are the gaps in the "C's".)

The detent tabs 82 have upwardly projecting ridgelike detents 86, which can be of semi-cylindrical shape (or of other shapes so long as thinner leading and trailing ends are provided in the longitudinal direction of the rails). As shown, the detents 86 extend transversely across the detent tabs 82 in a direction perpendicular to that of the rails.

At a selected distance from the ends of the rails 12, 14, the side grooves 84 have widened portions or reliefs 88 of, e.g., semi-cylindrical configuration, in the form of notches in the rail walls 85. The reliefs 88 are adapted and configured to receive the detents 86 therein, preferably with a slight clearance fit, and thus can be referred to as detent retainers.

During assembly of the end caps 16, 18 with the rails 12, 14, as the tabs 82 slide through the side grooves 84, the rail walls 85 cause the detent tabs 82 or, in an alternative embodiment, the detents 86 to flex. When the detents 86 reach the reliefs 88, the flexed detent tabs 82 or detents 86, whichever the case may be, snap back to their normal or "at rest" position due to the resiliency of the material from which they are made. In this way, the detents 86 are captured and retained in the reliefs 88.

In yet another embodiment, the rail walls 85 are flexed by the detents 86 as they pass therebetween until the detents 86 reach the reliefs 88, whereupon the detents 86 enter the reliefs 88 as the rail walls 85 return to their normal position, and thereby capture the detents 86 within the reliefs 88 and secure the end caps 16, 18 to the rails 12, 14.

Preferably, in all the foregoing embodiments, the end caps 16, 18 can be manually pulled out of the rails 12, 14 without tools, thus overcoming the detent arrangement.

Figure 3:
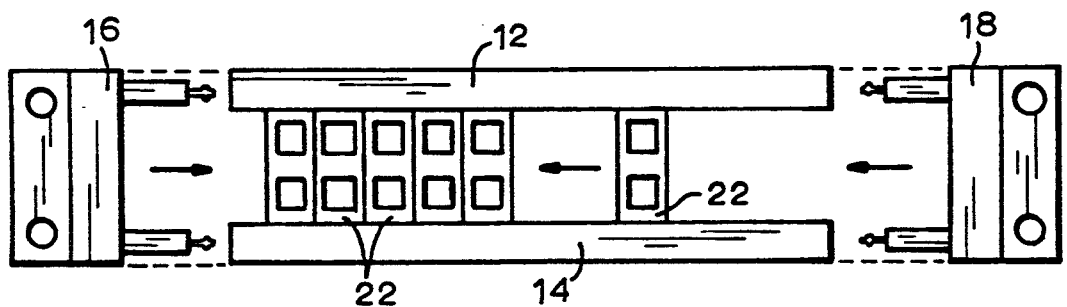
FIG. 3 is a front elevational view of the patch panel of FIG. 1 during assembly thereof.

The components of the patch panel 10 can be assembled in various ways. As illustrated in FIG. 3, for example, one of the end caps 16, 18 can be attached to one end of both rails 12, 14 by inserting the slide bars 34, 36 into the central opening 42 at that end until the detent 86 and reliefs 88 mate and thus latch the end caps 16, 18 to the rails 12, 14. Then, from the free end of the rails 12, 14, the faceplates 22 are slid into place along the opposing grooves 46, 48 in the rails 12, 14. Afterwards, the other end cap 18, 16 is attached, as described above.

Alternatively, one of the end tabs 72 of all the faceplates 22 can be inserted in the groove 46, 48 of one of the rails 12, 14. Then, the other end tab 74 of the faceplates 22 can be inserted into the other groove 48, 46, and, subsequently, the end caps 16, 18 can be attached to the rails 12, 14 as described above.

Yet another assembly technique requires that the faceplates 22 be suitably configured and made from an appropriately resilient material to allow the rails 12, 14 and end caps 16, 18 to be first assembled, and then the faceplates 22 inserted into the opposing grooves 46, 48 by being manually flexed so as to fit between the rails before material restoring forces return the faceplates 22 to their normal or "at-rest" configuration, thereby driving the end tabs 72, 74 into grooves 46, 48. This approach would also be desirable during servicing of the patch panel 10 for replacing one or more of the faceplates 22 without requiring more extensive disassembly of the patch panel 22.

With the embodiment illustrated in FIG. 1, if a greater number of faceplates 22 were desired than that shown, longer rails could be substituted for rails 12, 14, without requiring the replacement of other components of the patch panel 10. Shorter rails could accommodate fewer faceplates without needlessly providing unused space. On the other hand, if not all the space is required in the patch panel 10, faceplates 22a (FIG. 6) without central openings could be used as spacers and provide room in the patch panel for expansion.

Figure 4:
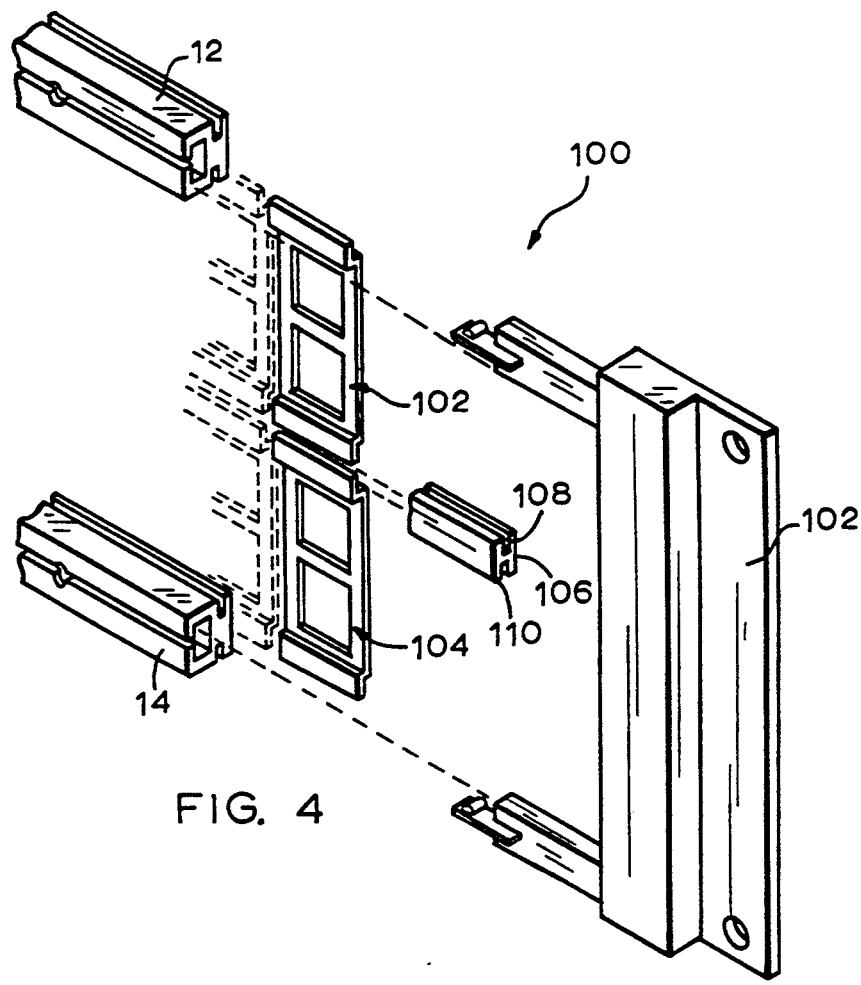
FIG. 4 is a partial, exploded, perspective view of a multi-tier patch panel in accordance with an alternative embodiment of the invention.
Figure 5:
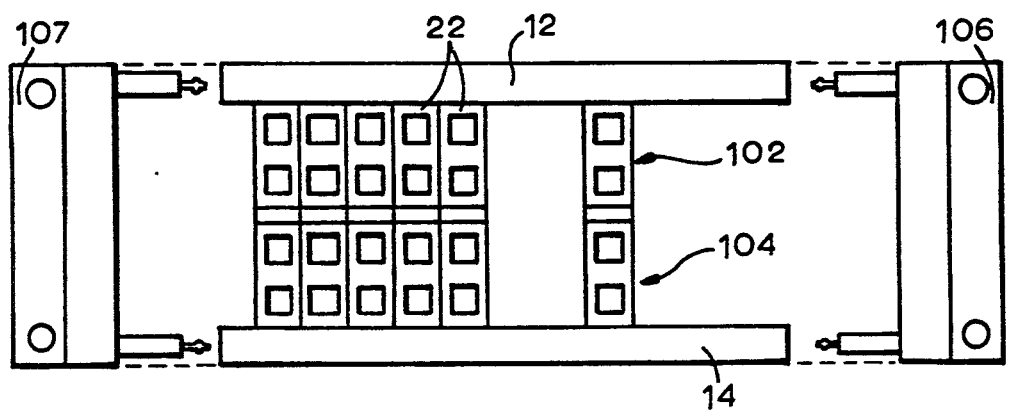
FIG. 5 is a front elevational view of the multi-tier patch panel of FIG. 4 during assembly thereof.

FIGS. 4 and 5 show an alternative embodiment of the invention, wherein a multi-tier patch panel 100 has a plurality of tiers or rows 102, 104 of faceplates 22. The invention contemplates that the faceplates 22 of patch panel 100 are the same height as those of panel 10 of FIG. 1. Accordingly, end caps 106, 107 are about twice as high as those in FIG. 1. However, it is preferred that the rails FIG. 1 be used for this embodiment as well so as to maintain standardization.

To interconnect and provide column stability between rows 102, 104, an elongate height extender 106 is provided as a middle rail. The height extender 106 has a top channel 108 for receiving end tabs 74, and a bottom channel 110 for receiving end tabs 76, each in the same fashion as channels 46, 48 of rails 12, 14. The height extender 106 is shown as an elongate element having a generally "H"-shaped cross-section. Alternatively, the rails 12, 14 can be used as height extenders. Accordingly, the invention contemplates the use of "n" rows of "m" faceplates forming a two-dimensional array, where "n" and "m" are positive integers.

Figure 6:
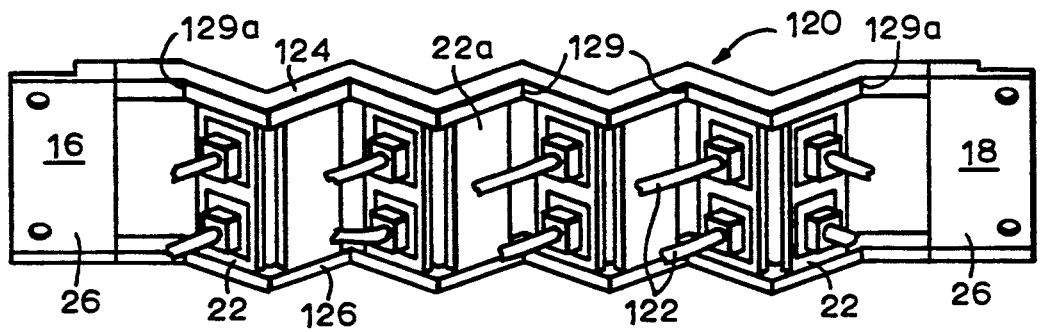
FIG. 6 is a perspective view of a patch panel adapted for fiber optic cable interconnections in accordance with a further embodiment of the invention.

FIG. 6 shows a patch panel 120 in accordance with a further embodiment of the invention that is particularly well suited for use with fiber optic cables 122. The difference between this version and that of FIG. 1 lies in the use of rails 124, 126 that are of a zig-zag construction, first bending at, e.g., about 45 degrees in a first direction and then bending back at, e.g., 45 degrees in the other direction. (The bend angles are preferably greater than zero and less than ninety degrees.)

In patch panel 120, the faceplates 22 are located in the straight portions 128 between the bends 129 in the rails 124, 126, and face angularly towards one or the other of the end caps 16, 18. Preferably, in this embodiment, the mounting plates 26 of the end caps 16, 18 remain coplaner to facilitate mounting. Note that the bends 129a nearest the end caps 16, 18 must not interfere with the receipt of the slide bars 34, 36 (FIG. 2) in the rails 12, 16.

The purpose for using such a geometry for the rails is to accommodate the special characteristics of fiber optic cables. Fiber optic cables can be damaged, and or their operation as light guides impaired, if bent beyond a selected radius of curvature. The importance of this consideration can best be explained with reference to FIGS. 7 and 8.

Figure 8:
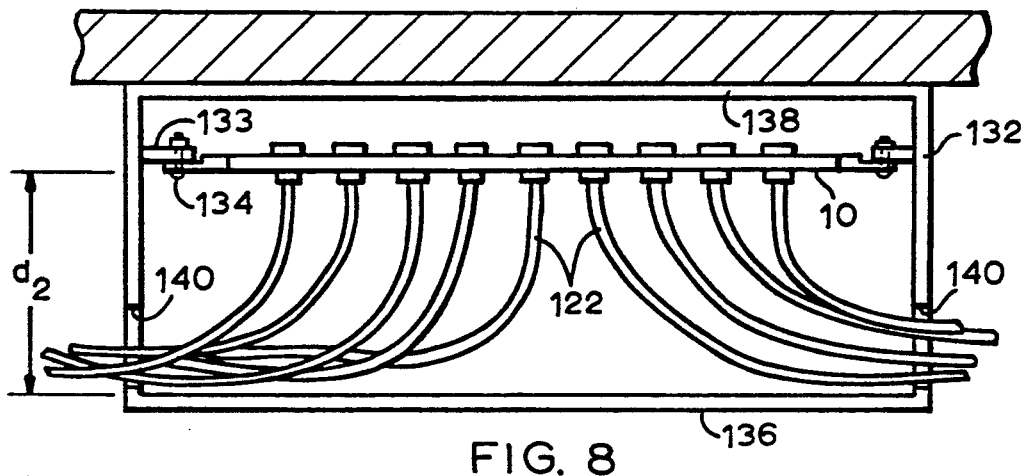
FIG. 8 is a top plan view of a prior art patch panel mounted in an enclosure on a wall.

FIGS. 7 and 8 show, respectively, the "zig-zag" patch panel 120 of FIG. 6 and the "flat" patch panel 10 of FIG. 1 mounted within enclosures 130, 132, which are mounted on a wall 30. The enclosures 130, 132 have mounting plates 133 to which the end cap mounting plates 26 are secured by fasteners 134. The enclosures 130, 132 also have front and rear covers 136, 138, and side ports 140 through which the fiber optic cables 122 pass. The distances "$d_1$" and "$d_2$" between the front covers 136 of the enclosures 130, 132 and the patch panels 122, 10 determine the available radii of curvature for the fiber optic cables 122.

In order to assure sufficient room for safe radii of curvature, the enclosure 132 for the "flat" panel 10 must protrude farther from the wall 30, in that "$d_1$" must be greater than "$d_2$." In applications where space is tight, or simply for aesthetic reasons, the "zig-zag" panel 120 is clearly more suited for optic cables.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A modular patch panel comprising:
   A) a plurality of modules for retaining a plurality of electrical elements;
   B) a plurality of faceplates for retaining said modules, and
   C) a frame for retaining said faceplates, said frame including
      i) first and second rails, each having first and second ends, and
      ii) first and second end caps, said first end cap releasably connected to said first ends of said rails, said second end cap releasably connected to said second ends of said rails, said faceplates being disposed between and held by said first and second rails and said first and second end caps, and
   D) wherein said rails comprise hollow tubes, and said end caps have portions configured to be received within the ends of said tubes.

2. A modular patch panel comprising:
   A) a plurality of modules for retaining a plurality of electrical elements;
   B) a plurality of faceplates for retaining said modules, and
   C) a frame for retaining said faceplates, said frame including
      i) first and second rails, each having first and second ends, and
      ii) first and second end caps, said first end cap releasably connected to said first ends of said rails, said second end cap releasably connected to said second ends of said rails, said faceplates being disposed between and held by said first and second rails and said first and second end caps, and
   D) wherein each end cap has a mountable end plate, and first and second spaced, generally parallel slide bars extending from said end plate, and each rail includes a central channel at said first and second ends for receiving one of said slide bars.

3. The modular patch panel in accordance with claim 2, wherein, each slide bar includes a detent for engaging one of said rails proximate one of said ends.

4. The modular patch panel in accordance with claim 3, wherein each said detent comprises a projection, and said detent-engaging means comprises a groove for releasably retaining said detent.

5. The modular patch in accordance with claim 2, wherein said end caps can be removed from said rails without the use of tools.

6. The modular patch panel in accordance with claim 2, wherein said faceplates are retained by said rails by a tongue and groove arrangement.

7. The modular patch panel in accordance with claim 2, wherein each said faceplate has end tabs on opposite sides thereof, and said rails have opposing channels for receiving said end tabs.

8. The modular patch panel in accordance with claim 2, wherein said rails are of zig-zag configuration, and include a plurality of straight portions, and wherein said faceplates are disposed between straight portions of said first rail and straight portions of said second rail, and wherein said end caps are coplanar.

9. The modular patch panel in accordance with claim 2, further comprising a height extender, and wherein said faceplates are secured between one of said rails and said height extender and form an array of a plurality of rows and columns.

10. A modular patch panel comprising:
  A) a plurality of faceplates, each faceplate holding at least one electrical element and including upper and lower edges defining faceplate tongues;
  B) first and second, longitudinally-extending, elongated rails disposed in spaced, generally parallel relation to one another, each rail including
    i) first and second end portions, each end portion having a mounting channel and a detent retainer, and
    ii) a faceplate-receiving groove extending longitudinally therealong for receiving the faceplate tongues of a plurality of said faceplates, and
  C) first and second end caps, each associated with a different one of said end portions of said first and second rails and comprising
    i) an end plate,
    ii) first and second, spaced, parallel mounting bars connected to and extending from said end plate, said mounting bars being receivable within said mounting channels of said associated end portions; and
    iii) first and second detents for engaging said detent retainers of said associated end portions, thereby retaining said mounting bars within said mounting channels; and
  D) wherein said first and second rails are oriented such that said faceplate-receiving grooves oppose one-another, and are spaced by a distance selected so that said faceplates are retained between said rails in side-by-side relation with said faceplate tongues of said faceplates disposed within said faceplate-receiving grooves of said rails.

11. The modular patch panel in accordance with claim 10, wherein each said end portion further includes a locking groove, an said detents are capable of defeatably mating with said locking grooves of said associated end portions, thereby releasably retaining said first and second rails to said end caps.

12. The modular patch panel in accordance with claim 10, wherein said mounting channels have generally "C"-shaped cross-sections defining gaps therein, and said locking grooves comprise said gaps.

13. The modular patch panel in accordance with claim 10, wherein said faceplate-receiving grooves extend continuously along the entire length of said first and second rails.

14. The modular patch panel in accordance with claim 10, further including a third, longitudinally-extending, elongated rail disposed in spaced, generally parallel relation to and between said first and second rails, said third rail including first and second longitudinally extending sides facing respective ones of said first and second rails, and first and second faceplate-receiving grooves extending longitudinally along respective ones of said rail sides for receiving said faceplate tongues, and wherein said faceplates are mounted within said patch panel in a plurality of rows, including a first row retained between said first and intermediate rails and a second row retained between said intermediate and second rails.

15. The modular patch panel in accordance with claim 10, wherein each said detent comprises a longitudinally extending, cantilevered tab, and a projecting element connected to and extending transversely across said cantilevered tab, and each said detent retainer comprises a locking groove for engaging said projecting element to defeatably retain said mounting bar within said mounting channel.

16. The modular patch panel in accordance with claim 15 wherein said projecting element has a generally semi-cylindrical shape.

* * * * *